Dec. 10, 1940.   R. J. BLUM ET AL   2,224,248
APPARATUS FOR TESTING THE CRUSH STRENGTH OF PAPER
Filed July 10, 1939   2 Sheets-Sheet 1
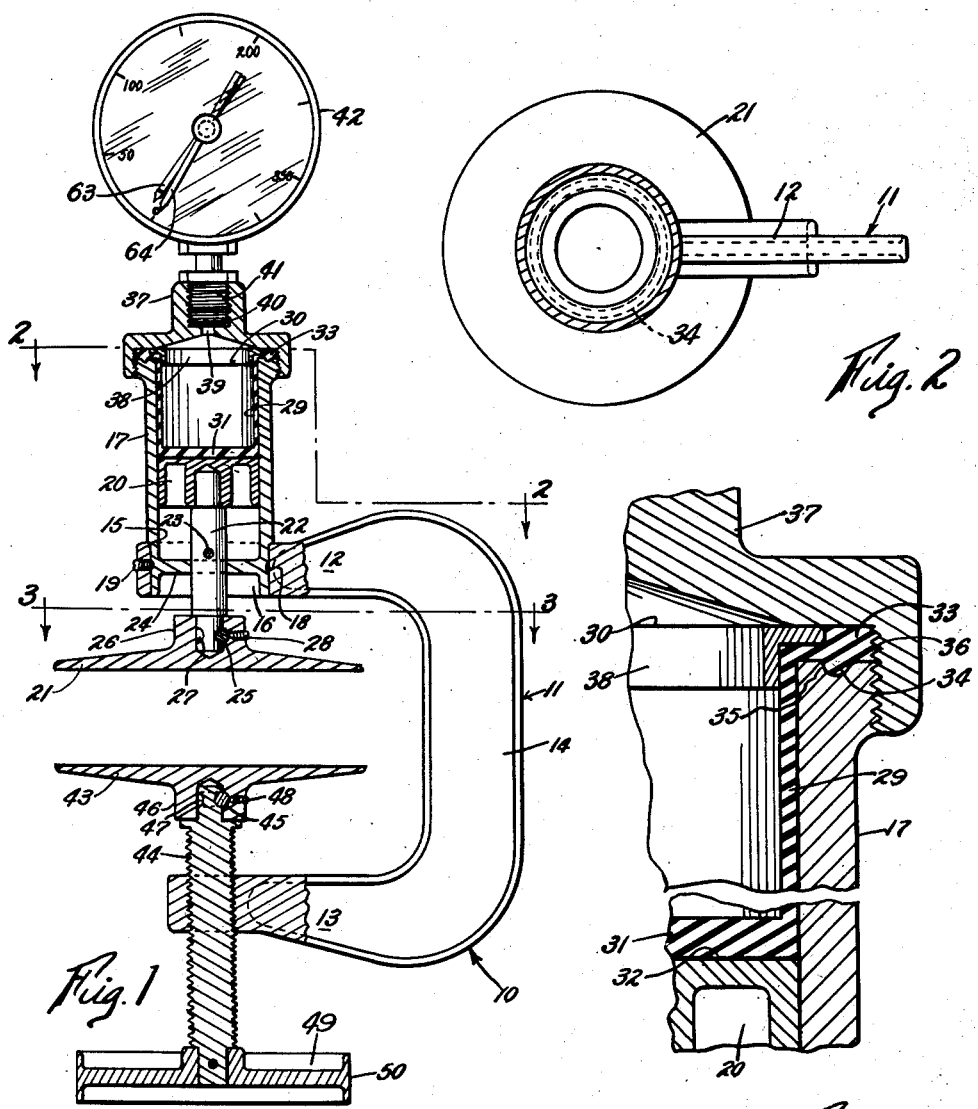
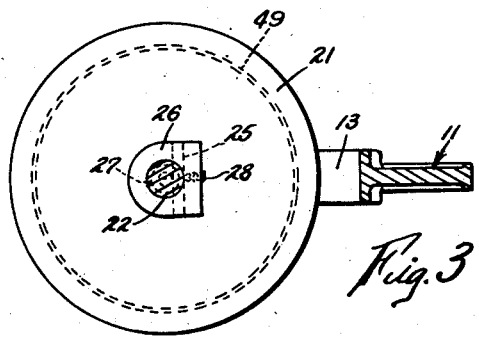
INVENTORS.
Robert J. Blum.
BY Maurice W. Gilbert.
Murray Sackhoff & Paddack.
ATTORNEYS.

Dec. 10, 1940.  R. J. BLUM ET AL  2,224,248
APPARATUS FOR TESTING THE CRUSH STRENGTH OF PAPER
Filed July 10, 1939  2 Sheets-Sheet 2
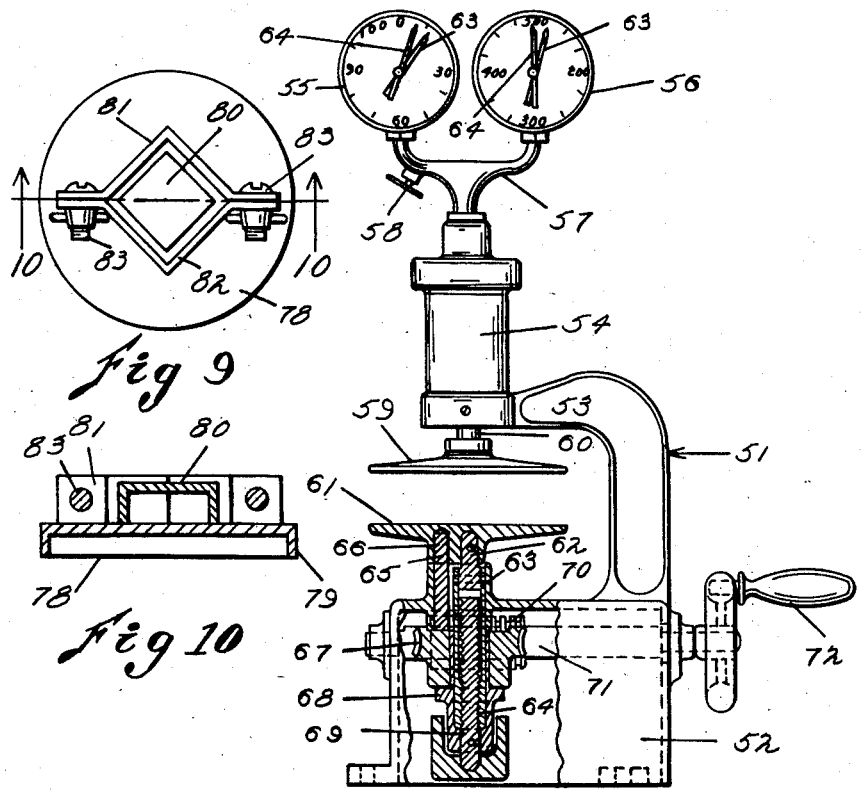
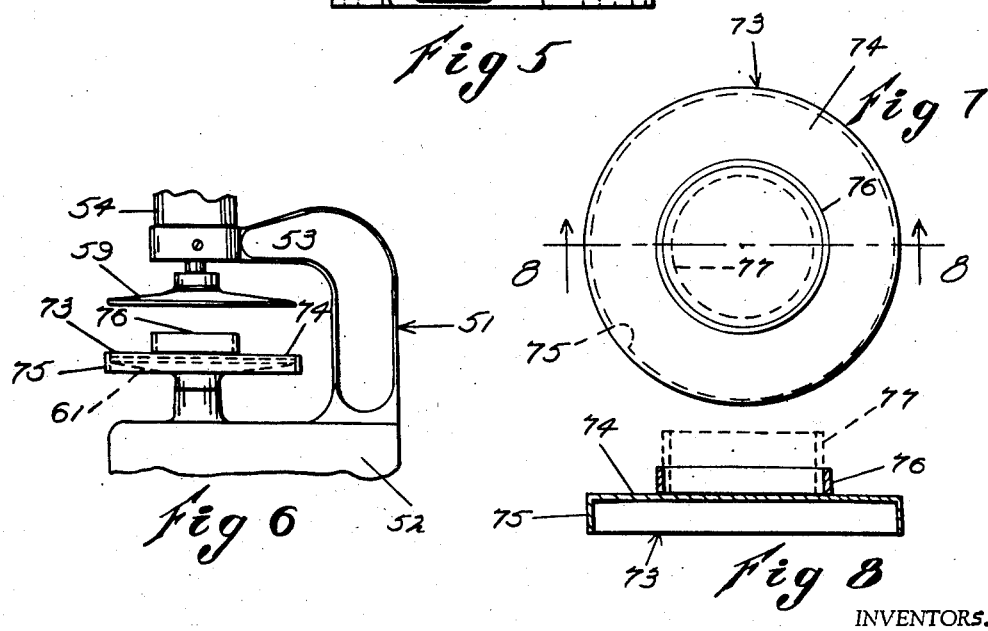
INVENTORS.
Robert J. Blum.
BY Maurice W. Gilbert.
Murray Sackhoff & Paddack.
ATTORNEYS.

Patented Dec. 10, 1940

2,224,248

UNITED STATES PATENT OFFICE

2,224,248

APPARATUS FOR TESTING THE CRUSH STRENGTH OF PAPER

Robert J. Blum, Indian Hill, and Maurice W. Gilbert, Lockland, Ohio

Application July 10, 1939, Serial No. 283,630

3 Claims. (Cl. 265—14)

The present invention relates to a device for obtaining the crush strength of corrugated paper or the like, and is particularly directed to a small and compact instrument capable of registering fine and delicate readings comparable to readings made upon larger and costlier devices.

It is an object of the invention to provide a simple and accurate means for determining the crush strength of paper.

Another object of the invention is to provide a precision instrument for measuring the crush strength of paper which may be transported from place to place as easily as articles of personal apparel.

A further object of the invention is to provide a pressure responsive cylinder which is of novel construction and which communicates with a direct reading pressure gauge.

A still further object of the invention is to provide a simplified means for holding the jaw members of the device.

Another object of the invention is to provide an attachment for the device which holds paper to be tested in other than flat relationship.

Other objects will be apparent from the following specification and drawings, in which:

Fig. 1 is a central, cross-sectional view, in elevation, of my measuring device, some parts thereof being shown in full lines.

Fig. 2 is a cross-sectional view taken on line 2—2 of Fig. 1.

Fig. 3 is a cross-sectional view taken on line 3—3 of Fig. 1.

Fig. 4 is an enlarged, fragmental view showing the detail of the cylinder and diaphragm construction.

Fig. 5 is a side elevational view, partly in cross-section, showing a modified form of my device.

Fig. 6 is a fragmental, elevational view of an attachment for my device.

Fig. 7 is an enlarged plan view of the attachment.

Fig. 8 is a cross-sectional view taken on line 8—8 of Fig. 7.

Fig. 9 is a plan view of a modified form of attachment for my device.

Fig. 10 is a cross-sectional view taken on line 10—10 of Fig. 9.

The embodiment of our invention comprises a measuring instrument 10 having a U-shaped frame 11 consisting of two spaced leg members 12 and 13 disposed in a horizontal position and connected by a vertical portion 14. The upper leg portion 12 of the frame is provided with an annular opening 15 which engages the lower reduced portion 16 of a vertically disposed cylinder 17. The means for fastening the cylinder to the frame comprises the formation of an annular groove 18 in the reduced portion of the cylinder which is engaged by a number of set screws 19 threaded in the frame.

A piston 20 is positioned within the cylinder and is connected to a jaw member 21 by means of a piston rod 22. As shown in Fig. 1, the piston is normally positioned in the lower portion of the cylinder and is maintained in the position indicated by means of a transverse pin 23 which engages an integral partition 24 through which the piston rod extends. As most clearly indicated in Fig. 3, the jaw member 21, which takes the form of a disk, is fastened to the piston rod by means of a pin 25 which is inserted in a reduced portion 26 of the disk and which engages an annular groove 27 formed in the shaft. A set screw 28 is provided for holding the pin in rigid operative position.

The cylinder is preferably adapted to contain an oil as its pressure transmitting medium and, to prevent said medium from leaking, a diaphragm 29 made of an oil-resistant rubber composition is positioned within the cylinder. The diaphragm, which is cylindrical in form, has an open end 30 and a closed end 31, the closed end being in engagement with the upper surface 32 of the piston 20. It will therefore be understood that the outer surface of the diaphragm engages the upper surface of the piston and also the side wall of the cylinder located above the upper surface 32 of the piston. As most clearly indicated in Fig. 4, the upper edge of the diaphragm is provided with an annular flange 33 which is disposed at right angles to the side wall of the said diaphragm. The flange is provided with an annular projection 34 which is received in an annular groove 35 formed in the uppermost edge of the cylinder 17. The upper exterior wall of the cylinder is provided with screw threads for engaging the interior threads 36 formed in a cap 37, a tight connection between the flange of the diaphragm and the top edge of the cylinder being afforded by tightening down said cap upon the cylinder.

A ring member 38 having a cross-section of an inverted L engages the upper portion of the interior wall of the diaphragm and the outer portion of the flange 33 adapted to retain said upper end of the diaphragm in normal extended position indicated in Fig. 1.

The central portion of the cap is provided with a passageway 39 which communicates with an annular threaded opening 40, the latter being adapted to receive the threaded portion 41 of a conventional oil pressure gauge 42. It will therefore be understood that pressure exerted on the oil contained within the diaphragm in the cylinder will be transmitted to the pointer actuating mechanism of the pressure gauge 42.

A lower jaw member or disk 43 is positioned on the free end of the lower leg member of the frame and is disposed in coaxial vertical alignment with the upper jaw member 21. The jaw member 43 is fastened to the upper end of a shaft 44 threaded to the leg member 13 by means of a pin 45 held in the reduced portion 46 of the disk and which is received in an annular slot 47. A set screw 48 rigidly positions the pin 45 within the reduced portion of the disk. The lower end of the threaded shaft is provided with a hand wheel 49 which has a knurled exterior face 50.

The device shown in Fig. 1 is adapted for transportation, whilst the device in modified form, shown in Fig. 5, is preferably used as a stationary testing device. The modified form of our invention, as shown in Fig. 5, has a U-shaped frame member 51 positioned upon base 52. The upper leg portion 53 of the U-shaped member is provided with an annular opening which engages the lower reduced portion of a vertically disposed cylinder 54, as shown in the device of Fig. 1. The cylinder 54 is provided with the piston, diaphragm and oil passageway indicated in Fig. 1, the oil pressure medium contained in the cylinder communicating with a minimum gauge 55 and a maximum gauge 56 positioned on the cylinder by means of a Y-pipe connection 57. The pipe connection to minimum pressure gauge 55 is provided with a cut-out valve 58 which is adapted to prevent pressures in excess of the capacity of the gauge from entering its mechanism when tests between 100 and 500 pounds are recorded on the maximum pressure gauge 56. An upper jaw member 59 is connected to the piston and cylinder 54 by means of connecting rod 60, similar to the construction of the device of Fig. 1.

As disclosed in the device of Fig. 1, the base is provided with a lower jaw member 61 which is adapted to move vertically in relation to the upper jaw member. The lower jaw member is pinned to a shaft 62 which, in turn, is rigidly fastened to a sleeve 63 provided at its lower end with interior threads 64. The disk is prevented from rotation by means of a guide rod 65 fastened to the base and adapted to freely engage an opening 66 in the lower jaw member. The sleeve 63 and the lower jaw member 61 are moved vertically by means of a worm gear 67 which is rigidly fastened to a member 68, the latter being pinned to a threaded shaft 69 adapted to engage the interior threads on sleeve 63. The worm gear is meshed with a worm 70 which is fastened to a shaft 71. The outer end of the shaft 71 is provided with a hand wheel 72.

In operation, the corrugated paper to be tested is horizontally positioned between the jaw members 21 and 43 of the device of Fig. 1, or jaw members 59 and 61 of the device of Fig. 5, so that said paper covers the entire area between said disks. The lower disk is then moved upwardly towards the upper disk by turning the hand wheels 49 or 72 until the respective jaw members begin crushing the paper. The pressure exerted by the disks on the sample of paper is recorded on the dial of the devices by transmission of said pressure from the upper jaw member, to the piston, to the oil within the diaphragm and cylinder, and thence to the pointer actuating mechanism of the gauge. With reference to the device of Fig. 5, when a test of a pressure less than 100 pounds is being made, readings are taken on minimum gauge 55, whilst in conducting tests with pressures greater than 100 pounds, the valve 58 is closed and readings are taken on the maximum pressure gauge 56. During the initial revolutions of the shaft connected to the lower jaw member or when small pressures are recorded by the instrument, maximum pressure indicating pointer 63 and pointer 64 move simultaneously towards greater pressures. When a pressure has been reached which causes the pointer 64 to return towards zero, whilst the shaft remains stationary, the operator is informed that the pressure for primary crush of the paper has been reached. The pointer 64 tends to return to zero because the breakdown of the fiber in the paper tends to relieve the pressure between the disks. When the above pressure reading has been taken, the hand wheel is again rotated and the pressure on the sample of paper increased, the pointer 64 returning towards zero after each successive revolution of the wheel until a maximum pressure has been reached indicated by the pointer 64 failing to move towards zero. This pressure reading indicates the highest and final crush strength of the particular sample of corrugated paper tested.

Figs. 6 to 10, inclusive, illustrate two forms of attachment for holding a sample of paper edgewise between the jaw members of our paper tester. The attachment 73, shown in Figs. 6, 7 and 8, is adapted to make the so-called "ring test" on paper and comprises a circular base 74 which is removably positioned on the lower jaw member 61 by means of downwardly extending flange 75. The central portion of the base has an upstanding annular rim 76 which is adapted to receive a sample of paper indicated at 77 in a cylindrical form with its edges in a vertical position relative to the jaw members.

The attachment shown in Figs. 9 and 10 is adapted to hold a sample of paper edgewise relative to the jaw members of our paper tester so that said paper is in the form of a square in transverse cross-section. This attachment has a circular base 78 having a downwardly depending flange 79 which is adapted to insert the lower jaw member of our devices. The central portion of the base has an upstanding square member 80 fastened centrally thereof, the outer vertical walls of which engage the sample of paper. A pair of clamp members 81 and 82 are adapted to encircle the sample of paper and securely fasten said paper to the member 80 by means of bolts and wing nuts 83.

What is claimed is:

1. In a device for measuring the crush strength of paper the combination of a frame, a cylinder mounted on the frame, a piston within the cylinder and normally disposed in the lower end of the cylinder, an upper jaw member, a piston rod connecting said jaw member and the piston, a cylindrical diaphragm having an open and a closed end and positioned within the cylinder with the closed end thereof abutting the upper face of the piston, a flange extending at right angles from the edge of the open end of the diaphragm, a cap for the cylinder adapted to close the upper end of the cylinder and clamp the flange of the diaphragm to the cylinder, a pressure gauge for the cylinder positioned on the cap, a lower jaw member mounted on the frame, and means for moving the lower jaw member toward the upper jaw member.

2. In a device for measuring the crush strength of paper the combination of a frame, a cylinder mounted on the frame, a piston within the cylinder and normally disposed in the lower end of the cylinder, an upper jaw member, a piston rod connecting said jaw member and the piston, a cylindrical diaphragm having an open and a closed end and positioned within the cylinder with the closed end thereof abutting the upper face of the piston, an annular flange extending at right angles from the edge of the open end of the diaphragm, an annular projection on the lower face of the flange, an annular groove in the upper edge of the cylinder, a cap fastened to the upper end of the cylinder and adapted to retain the projection in the groove, a ring member in engagement with the inner surface of the diaphragm and the upper edge of the flange and adapted to hold the upper end of the diaphragm in extended position, a pressure gauge mounted on the cap, a lower jaw member mounted on the frame, and means for moving the lower jaw member toward the upper jaw member.

3. In a device for measuring the crush strength of paper the combination of a U-shaped frame having two opposed leg members, a cylinder vertically mounted on the free end of the upper leg of the frame, a piston within the cylinder, and normally disposed in the lower end thereof, an upper jaw member disposed between the leg members, a piston rod connecting said jaw member with the piston, a cylindrical diaphragm having an open and a closed end and positioned within the cylinder with the closed end abutting the upper face of the piston, an annular flange extending at right angles from the edge of the open end of the diaphragm, an annular projection on the lower face of the flange, an annular groove in the upper edge of the cylinder, a cap fastened to the upper end of the cylinder and adapted to retain the projection in the groove, a ring member in engagement with the inner surface of the diaphragm and the inner portion of the upper edge of the flange and adapted to hold the upper end of the diaphragm in extended position, a pressure gauge mounted on the cap and communicating with the cylinder, a lower jaw member located between the lower leg member and the upper jaw member and disposed in co-axial alignment with said member, a vertical shaft threaded to the free end of the lower leg member and rotatably fastened to the lower jaw member, and a hand wheel fastened to the lower end of the shaft.

ROBERT J. BLUM.
MAURICE W. GILBERT.